United States Patent
Kornmann et al.

(10) Patent No.: US 11,860,956 B2
(45) Date of Patent: Jan. 2, 2024

(54) METADATA BASED BI-DIRECTIONAL DATA DISTRIBUTION OF ASSOCIATED DATA

(71) Applicant: SAP SE, Walldorf (DE)

(72) Inventors: Tim Kornmann, Reilingen (DE); Thomas Biesemann, Bruchsal (DE); Alexander Fuerbach, Heidelberg (DE)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 16/870,216

(22) Filed: May 8, 2020

(65) Prior Publication Data
US 2021/0349958 A1    Nov. 11, 2021

(51) Int. Cl.
*G06F 16/9532* (2019.01)
*G06F 16/9538* (2019.01)
*G06F 16/16* (2019.01)
*G06F 16/951* (2019.01)
*G06F 16/28* (2019.01)
*G06F 16/907* (2019.01)

(52) U.S. Cl.
CPC ........ *G06F 16/9532* (2019.01); *G06F 16/168* (2019.01); *G06F 16/284* (2019.01); *G06F 16/907* (2019.01); *G06F 16/951* (2019.01); *G06F 16/9538* (2019.01)

(58) Field of Classification Search
CPC .. G06F 16/9532; G06F 16/907; G06F 16/284; G06F 16/168; G06F 16/951; G06F 16/9538
See application file for complete search history.

(56) References Cited

U.S. PATENT DOCUMENTS

| | | | | |
|---|---|---|---|---|
| 7,013,299 | B1* | 3/2006 | Sherwood | G06F 16/219 707/999.01 |
| 2008/0250017 | A1* | 10/2008 | Best | G06F 16/148 707/999.006 |
| 2013/0346400 | A1* | 12/2013 | Ramsey | G06F 16/951 707/723 |
| 2014/0164412 | A1* | 6/2014 | Rosenberg | G06F 16/211 707/756 |
| 2015/0066851 | A1* | 3/2015 | Henderson | G06F 16/288 707/624 |

* cited by examiner

*Primary Examiner* — Kannan Shanmugasundaram
(74) *Attorney, Agent, or Firm* — Mintz Levin Cohn Ferris Glovsky and Popeo, P.C.

(57) ABSTRACT

A method may include receiving, at a search engine, an indication that a first data object was created. The search engine may fetch metadata associated with the first data object, the metadata including a description of the first data object and a binding expression including relational information between the first data object and at least one other data object. The search engine may add data from the at least one other data object to the first data object. The search engine may store the metadata and the first data object in an index of the search engine, the index associated with the first data object. The search engine may receive a search phrase. The search engine may generate a search result that includes the relational information retrieved from the index. Related systems and articles of manufacture, including computer program products, are also provided.

18 Claims, 6 Drawing Sheets

```
{
  "name": "opportunity",
  "document": {
    "name": "opportunity"
    "attributes": [
      { "name": "id", "type": "keyword" },
      { "name": "name", "type": "text", "label": "Name", "sortable": true, "filterable": true, "searchable": true },
      { "name": "accountId", "type": "keyword", "label": "Account ID", "filterable": true },
      { "name": "accountDescription", "type": "text", "label": "Account", "bindingExpression":
        "~Account.name", "sortable": true, "filterable": true, "searchable": true },
      "associations": [
        { "name": "Account", "targetMetadataFilePath": "../cxm/AccountsIndexMetadata.json"
          "sourceAttribute": "accountId", "targetAttribute": "id" },
      ]
  }
}
```

FIG. 4

METADATA BASED BI-DIRECTIONAL DATA DISTRIBUTION OF ASSOCIATED DATA

TECHNICAL FIELD

The subject matter described herein relates generally to bi-directional data distribution.

BACKGROUND

A database, such as a relational database, a non-relational database, and/or the like, may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program products, are provided for metadata based bi-directional data distribution. In one aspect, there is provided a system including at least one data processor and at least one memory. The at least one memory may store instructions that cause operations when executed by the at least one data processor. The operations may include receiving, at a search engine, an indication that a first data object was created. The operations may further include in response to receiving the indication, fetching, by the search engine, metadata associated with the first data object. The metadata includes a description of the first data object and a binding expression including relational information between the first data object and at least one other data object. The operations may further include adding, in response to the fetching and based on the relational information, data from the at least one other data object to the first data object. The operations may further include storing, in response to the fetching, the metadata and the first data object in an index of the search engine, the index associated with the first data object. The operations may further include receiving, by the search engine, a search phrase. The operations may further include generating, by the search engine and based on the metadata, a search result including the relational information retrieved from the index.

In some variations, one or more features disclosed herein including the following features can optionally be included in any feasible combination. The operations may further include obtaining, by the search engine, an indication that a first value of a first data object has changed to a second value. The operations may further include identifying, based on the metadata, at least one data object referring to the first data object. The operations may further include updating, in response to the identifying, the at least one data object with the second value. The identifying may include inverting the at least one data object. Adding metadata to the data object may be performed by a metadata server. Generating the search result may include presenting the search result on a user interface. The database may include a relational database. The search engine may query the database by at least sending, to the database, one or more structured query language (SQL) statements. The metadata may include a binding expression, the binding expression including relational information between data objects. The search phrase may be processed by at least eliminating variations of one or more words in the search phrase. Storing the metadata may include storing the metadata in a secondary persistence of the database. The metadata may include a tree data structure having nodes, the nodes including data fields.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts an example of a JavaScript object notation (JSON) format file defining and adding metadata to a data object, in accordance with some example embodiments;

When practical, similar reference numbers denote similar structures, features, or elements.

DETAILED DESCRIPTION

Figure 1:
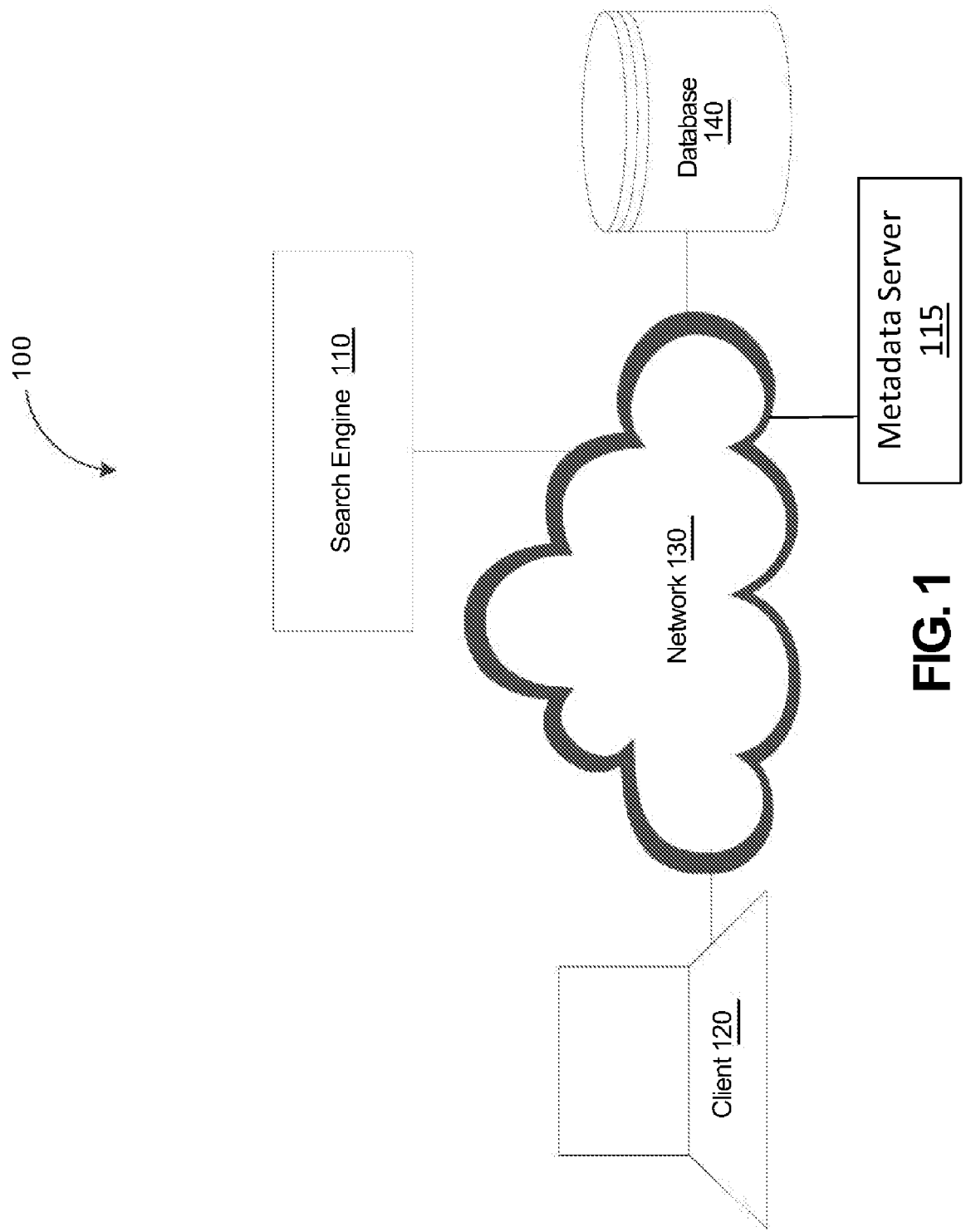
FIG. 1 depicts a system diagram illustrating a search system, in accordance with some example embodiments.

A search engine may be configured to identify one or more items that match a search phrase. For example, a user may input, into the search engine, a search phrase describing an item such as, for example, a product, a service, and/or the like. The search phrase may include one or more words. In response to the receiving the search phrase from the user, the search engine may query, based on the search phrase, a database storing a plurality of item descriptions. Each item description stored in the database may correspond to an item. Furthermore, each item description may also include one or more words.

As such, a conventional search engine may identify items that match the search phrase based on a quantity of words in each item description that match the words appearing in the search phrase. Search engines may rely on heavily de-normalized data. This is because they usually work on document storages and not on relational databases. Search engines may rely on data replication from a primary persistent storage (e.g., a relational database or a document store). An example of a search engine is elastic search which in turn orchestrates and manages Apache Lucene reverted indices. These indices may store documents and provide search capabilities. Each index may be a data silo and may have no associations/relations to other indices. Example indices may include accounts, contacts, employees, opportunities, sales orders, or the like.

Data may, however, need to be consistent and may need to be stored in a normalized way. For example, a database account may have a contact and may store keys of the contacts in a child table or child node. Keys may not be human readable data but technical (e.g., a globally unique identifier (GUID), a universally unique identifier (UUID), or the like). In another example, transactional documents (e.g., opportunities, sales orders, and the like) may refer to master data objects (e.g., account, contact, employees, or the like). The transactional documents may also only store the technical key (e.g., UUID). Only this technical key may be stable (e.g., unchanging) as other human readable fields might change over time (e.g., account names, contact names, addresses, or the like as well as human readable keys may change). Thus, only the technical key may be used for referencing data. To guarantee transactional consistency, data may not be de-normalized and may need to be redundancy-free in a primary persistency to avoid inconsistencies.

For example, a user may want to search for items, such as opportunities or a sales order referring to an account via an account name. If the data is stored in a normalized way, then some join logic may need to be used to search in opportunities and/or sales orders and in an associated account persistency. This join logic may result in slow processing times as an enterprise database system that may include millions of accounts as well as millions of opportunities and/or sales order entries. These slow processing times may provide motivation to replicate the data into a search engine (e.g., search engine 110) and somehow de-normalize it there.

It may be beneficial to introduce metadata for the searchable entities or objects in a database, such as opportunity, account, sales order, or the like. The metadata may describe the document or object to be indexed in a de-normalized way. The document may be described as a tree containing nodes which in turn have data fields. The fields can either come directly from the searchable entity or they can refer to another entity. For example, a sales order index metadata may include an account universally unique identifier (UUID) field which is a foreign key to the account and may contain an account description. The account UUID may come directly from the sales order whereas the account description may be read and stored from the account index. The latter is done by introducing a binding expression in the account description metadata in the opportunity index. This binding expression may refer to the name field of the account index facilitating the foreign key account UUID. Whenever now an opportunity (or other data object) gets created and replicated to the search engine, the search engine may identify the foreign key relationship, may retrieve the account name from account index, and may store it in the account description field in the opportunity index.

In some example embodiments, if a field, such as an account name, changes and already existing opportunities or sales orders have the previous name persisted in their indices, the search engine may memorize all foreign keys to an entity, invert them, and update the referring data based on the metadata described above. Thus, the consistency may be ensured in a bi-directional way.

FIG. 1 depicts a system diagram illustrating a system 100, in accordance with some example embodiments. Referring to FIG. 1, the search system 100 may include a search engine 110 that is communicatively coupled with a client 120, a metadata server 115, and a database 140. It should be appreciated that the client 120 may be any type of processor and memory based device including, for example, a cellular phone, smart phone, a tablet, a laptop computer, a desktop, a workstation, and/or the like. Meanwhile, the network 130 may be any wired and/or wireless network including, for example, a public land mobile network (PLMN), a local area network (LAN), a wide area network (WAN), a virtual local area network (VLAN), the Internet, and/or the like.

The database 140 may be any type of database including, for example, a graph database, an in-memory database, a relational database, a non-relational database (e.g., NoSQL, graph, etc.), and/or the like. The metadata server 115 may be in communication with the search engine 110, a client 120, and/or the database 140 via the network 130 and may be responsible for managing a request from the client 120 to add (e.g., "commit") a new content item to a content management system, such as the database 140. The metadata server 115 may be configured as a centralized repository that stores, manages and delivers metadata for applications and/or data objects within an organization or database management system. The metadata server 115 may also be configured to add metadata associated with a data object. The metadata may include descriptions of the data objects stored in the database 140.

The database 140 may store data, such as documents, data object values, item descriptions for a plurality of items, or the like. Data stored in the database 140 may need to be consistent and may be stored in a normalized way. Normalization may entail organizing data of a database to minimize redundancy (e.g., duplicate data) and to ensure only related data is stored in each table of the database (e.g., ensure that data dependencies are properly enforced by database integrity constraints).

The search engine 110 may include indices. These indices may store data (e.g., documents) and provide search capabilities. For example, In order to search the database 140, the search engine 110 may process and store information it finds from the database 140 in an index of the search engine 110. In some databases, such as relational databases, the information in the database 140 may be normalized and may need to be de-normalized to facilitate proper search capabilities. In order to de-normalize the data from the database 140 and ensure consistency in the data, it may be beneficial to introduce metadata for the data from the database 140 to be indexed in the search engine 110.

Metadata may help facilitate searching by not requiring exact matches to search terms. Metadata may contain structured, encoded data that describes characteristics of a file with which it is associated. For example, a user may conduct a search of data files stored in a database. Those data files may include a newspaper article that mentions, for example, a company's president but not the company name itself. If the user conducts a full text search of the files using a search string that includes the company name, but not the name of the president, the file may not be produced in the search results. However, metadata may be used to link the president's name to the company.

The metadata may de-normalize the data for searching while maintaining consistency of the data in a primary persistence of the database 140. The metadata may also facilitate consistency in the search engine by allowing more efficient identification of associated data referencing data that has been updated or modified. The identification may be facilitated by including a binding expression in the metadata. The binding expression may reference associated data in the searched item or another data object. Introducing this metadata for both search and updating of data in the database 140 may ensure the consistency of data in the database 140 and in the indices of the search engine. Thus, the metadata described herein may provide an advantage over traditional search engines where consistency of de-normalized data may be implemented manually per object which may lead to increased errors in databases having a large quantity of entries.

The search engine 110 may identify documents of the database 140 that match a search phrase received from the client 120 by at least querying the database 140 to retrieve one or more documents and/or associated data. For instance, the search engine 110 may query the database 140 to retrieve a list of matching documents with the search query, which may be sorted based at least on a relevance score for each of the matching item descriptions. A document may match the search phrase if a word, identifier, or a string of the data object includes at least one word that appears in the search description.

In some example embodiments, the search engine 110 may receive, from the client 120, a search phrase that include one or more words. In response to receiving the search phrase from the client 120, the search engine 110 may preprocess the search phrase. For instance, the preprocessing of the search phrase may include tokenizing the search phrase into individual words. The search phrase may also be cleaned to remove stop words, numerical digits, non-alphabet symbols, and/or the like. Alternatively and/or additionally, the preprocessing of the search phrase may include supplementing and/or replacing one or more words from the search phrase with synonyms and/or hypernyms, which may be more general than the original words. The search engine 110 may further stem and/or lemmatize the search phrase to eliminate multiple variations (e.g., inflected forms and/or the like) of the same word.

In some example embodiments, the preprocessing of the search phrase can further include resolving typographical errors appearing in the search phrase. For example, the search engine 110 may encounter an incorrect word in the search phrase (e.g., "aple" instead of "apple," "code" instead of "core," and/or the like). In response to the presence of an incorrect word, the search engine 110 may identify one or more correct words by at least identifying words that are a threshold distance away from the incorrect word. For instance, the search engine 110 may identify the correct words by applying, to an incorrect word, a distance algorithm including, for example, Levenstein distance, and/or the like. The search engine 110 may further replace the incorrect words with the correct words before querying the database 140 using the preprocessed search phrase. That is, the search engine 110 may query the database 140 to retrieve item descriptions that match the preprocessed search phrase containing the correct words instead of the original search phrase including the incorrect words.

In some example embodiments, the search engine 110 may query the database 140 to retrieve, from the database 140, one or more data objects that match the preprocessed search phrase. Furthermore, the search engine 110 may identify, based at least on the matching data object retrieved from the database 140, one or more items matching the search phrase received from the client 120. For instance, the search engine 110 may send, to the database 140, a query to return a list of account descriptions associated with a sales order.

To further illustrate, the search engine 110 may receive, from the client 120, a search phrase that includes a sales order having an account name, such as "Coca-Cola." As noted, the account name may be associated with an identifier, such as a UUID. In response to receiving the search phrase, the search engine 110 and/or the metadata server 115 may add metadata to the sales order to facilitate searching and/or storage. A sales order index of the search engine 110 may include metadata having an account UUID field which is the foreign key to the account and contains an account description. The account UUID may come directly from the sales order index whereas the account description may be read and stored from an account index of the search engine 110. For instance, the account description metadata may include a binding expression in the sales order index. This binding expression may refer to the name field of the account index facilitating the foreign key account UUID. Now, in response to adding the metadata, whenever a sales order or other data object gets created and replicated to the search engine 110, the search engine 110 may identify the foreign key relationship and may retrieve the account name from the account index and store it in the account description field in the sales order index. It should be appreciated that while certain indices and metadata are described in the above example, other indices and/or metadata may be used.

Figure 2:
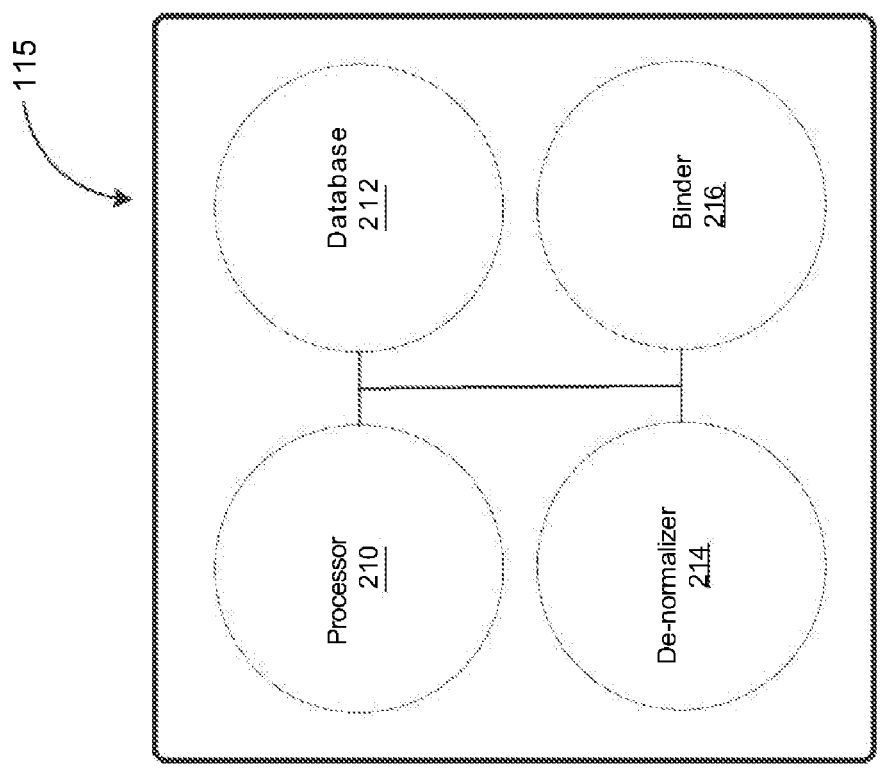
FIG. 2 depicts a block diagram illustrating a metadata server, in accordance with some example embodiments.

FIG. 2 depicts a block diagram illustrating the metadata server 115, in accordance with some example embodiments. Referring to FIGS. 1-2, the metadata server 115 may include a processor 210, an identifier 212, a de-normalizer 214, and a binder 216. It should be appreciated that the metadata server 115 may include additional and/or different components than shown. While the metadata server 115 is shown external to the search engine 110 in FIG. 1, in some aspects, the metadata server 115 may be implemented as internal to the search engine 110.

In some example embodiments, the processor 210 may be configured to process a search phrase received from the client 120. For instance, the search engine 110 may receive, from the client 120, a search request for a sales order referring to an account via an account name. The processor 210 may respond to the receipt of the search request by processing the search phrase account name. The processing of the search phrase may include tokenizing the search phrase to individual words and cleaning the search phrase, for example, to remove stop words, numerical digits, non-alphabet symbols, and/or the like. The processing of the search phrase may also include replacing incorrect words with correct words identified, for example, by applying a distance algorithm (e.g., Levenstein distance and/or the like) to the incorrect words. Alternatively and/or additionally, the processor 210 may process the search phrase by lemmatizing the search phrase to eliminate multiple variations (e.g., inflected forms and/or the like) of the same word. According to some example embodiments, the processing of the search phrase may further include supplementing and/or replacing one or more words from the search phrase with synonyms and/or hypernyms, which may be more general than the original words. It should be appreciated that the processor 210 may identify synonyms and/or hypernyms based on the category of the original words.

In some example embodiments, the database 212 may be configured to store metadata. For example, the database 212 may store metadata describing files or documents stored in a different database (e.g., database 140). In some aspects, the database 212 may be internal to the metadata server 115 or may be external and in communication with the metadata server 115.

In some example embodiments, the de-normalizer 214 may be configured to generate metadata that describe documents to be indexed by the search engine 110 in a de-normalized way. For example, the de-normalizer 214 may describe a document as a tree containing nodes which in turn have data fields. In some aspects, without adding the metadata described herein, data consistency of de-normalized data may have to be implemented manually per object and is thus may require more processing time. If many data objects/entities of a database are searchable, then data searching may become error prone.

In some example embodiments, the binder 216 may be configured to include a binding expression in the metadata. The binding expression may include relationship or association information between objects. For example, the binding expression may refer to an association between an account and a foreign key (e.g., UUID). In order to fill an account description field of an index (e.g., sales order index), the search engine 110 may identify the foreign key relationship between the account and foreign key, and may retrieve the account name from the account index and store it in the account description field in the sales order index.

Figure 3:
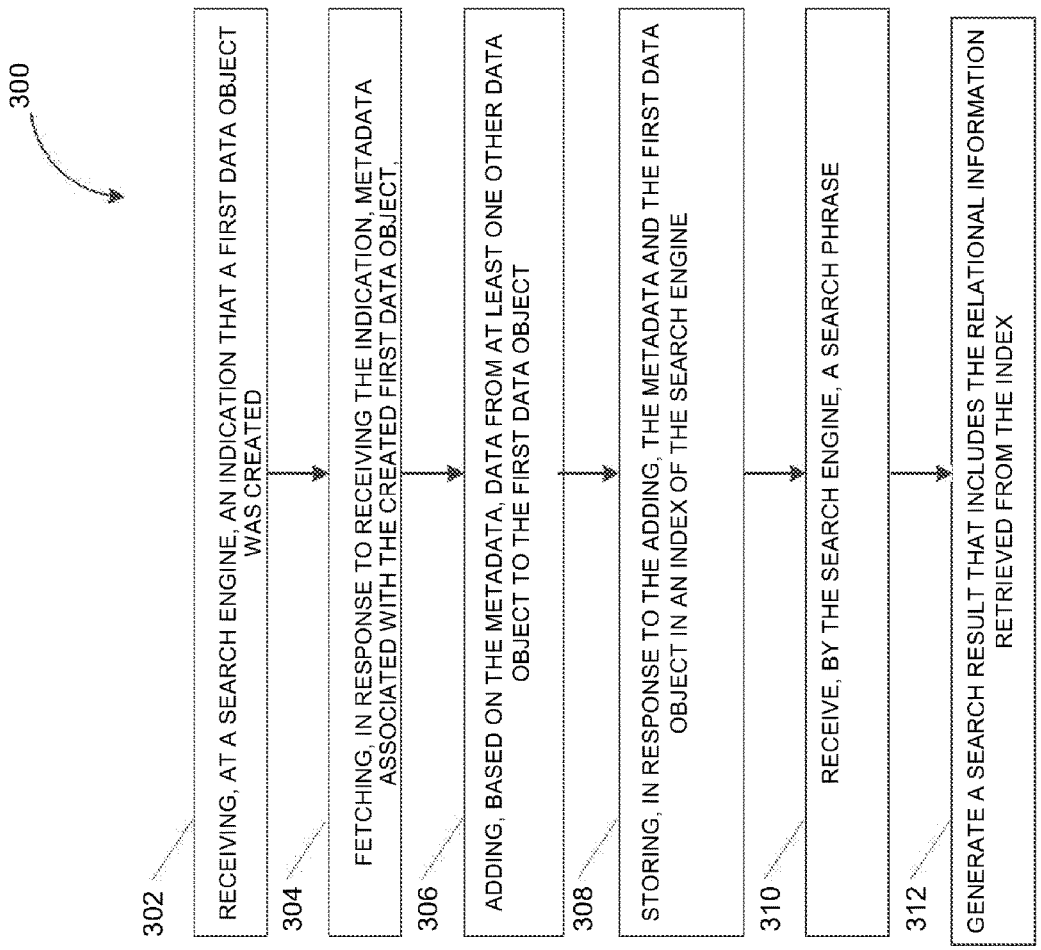
FIG. 3 depicts a flowchart illustrating a process for performing a search based on metadata, in accordance with some example embodiments.

FIG. 3 depicts a flowchart illustrating a process 300 for performing a search, in accordance with some example embodiments. Referring to FIGS. 1-3, the process 300 may be performed by the search engine 110, the metadata server 115, or the like.

At 302, the search engine 110 may receive, from the client 120, a search phrase. For example, as shown in FIG. 1, the search engine 110 may be coupled with the client 120 via the network 130, which may be any type of wired and/or wireless network including, for example, a public land mobile network (PLMN), a local area network (LAN), a wide area network (WAN), a virtual local area network (VLAN), the Internet, and/or the like. The search engine 110 may receive an indication that a first data object was created. For example, the first data object (e.g., a sales order, an account, an opportunity, or other data object) may be created by developers at development time or by a user of a database management system via a user interface. In response to creation of the first data object, the database management system (e.g., database 140) may send a message to the search engine 110 indicating that the first data object was created.

At 304, the search engine 110 may, in response to receiving the indication, fetch metadata associated with the first data object. The metadata may include a description of the first data object and may include a binding expression that includes relational information between the first data object and at least one other data object. For example, as discussed below with respect to FIG. 4, an example binding expression, "~Account.name", may indicate to the search engine 110 to that within the opportunity index the data object (e.g., index) "account" is associated with data from the data attribute "name". The search engine 110 may use this association defined in the binding expression to include data from the "name" data field of the "account" data object into the opportunity object accountDescription attribute. In some example embodiments, the metadata may be retrieved from the metadata server 115.

At 306, the metadata server 115 may add, in response to the fetching and based on the relational information, data from the at least one other data object to the first data object. For example, in response to detecting the binding expression, the search engine 110 may determine that an account "Coca-Cola" with an account ID 11120 is associated with data from the "name" data object. The processor 210 may read the associated data (e.g., an account description), and add that data to the data object (e.g., the opportunity data object of FIG. 4)

FIG. 4 depicts an example of JavaScript object notation (JSON) format file 400 defining and adding metadata to a data object. In some aspects, the JSON file 400 may be included in the search engine 110 and/or the metadata server 115 when the search engine 110 and/or the metadata server 115 are installed in the system 100. As shown in FIG. 4, the file 400 defines attributes "id", "name", and "accountId", belonging to an "opportunity" data object and defines an additional attribute "accountDescription" 402. As shown, this accountDescription attribute 402 defines a binding expression 404 "bindingExpression" attribute which includes a binding expression 404 "~Account.name". The binding expression 404 "~Account.name" may indicate to the search engine 110 to use an association "account" from a defined "associations" part 406 of the JSON file 400 and retrieve the attribute "name" from the association's target Index Metadata (e.g., AccountsIndexMetadata.json). The name attribute may then be an attribute of the AccountsIndexMetadata.json file, similar to the name attribute of the opportunity data object shown in FIG. 4.

In some aspects, the binding expression "~Account.name" 404 in the example of FIG. 4 may be interpreted in the following manner: the "~" character before an expression token (e.g. Account) indicates an association. An expression parser (e.g., processor 210) may search for an association with the account data object. The "." character of the binding expression 404 may mask an attribute following the "." character. The expression parser may look up an attribute, for example, "name" in the preceding association's target Index. In some aspects, the binding expression 404 may have multiple associations. For example, the binding expression "~Account~Address~FormattedAddress" may be interpreted in the following manner: use the association account and go to the account index, from there, use the address association to go to the address index, and from the address index, take the formatted address.

The metadata may be created and maintained by developers at development time, and users of a database system may also be able to add metadata to a data object via a user interface, which may orchestrate a metadata layering mechanism. When a new data object is created or modified, the database 140, the client 120, or another apparatus connected to the network 130, may send a message to the search engine 110 indicating the creation or modification of the data object. In response to the message indicating the new data object, the search engine 110 may fetch the metadata associated with the data object and may store the metadata in an index of the data object. In response to fetching the metadata, the search engine 110 may detect a binding expression of the metadata. Based on the binding expression, the search engine 110 may fetch associated data referred to in the binding expression and store the associated data with the data object. For example, an account name may have changed from "Coca-Cola" to "Coca-Cola, Inc" the binding expression may be used to determine other data objects affected by the change, as further described with respect to FIG. 5.

Referring back to FIG. 3, at 308, the search engine 110 may store, in response to the adding, the metadata and the first data object, in an index of the search engine. For example, referring to FIG. 4, the search engine 110 may determine that an account "Coca-Cola" with an account ID 11120 is associated with data from the "name" data object. The processor 210 may read the associated data (e.g., an account description), and add that data to the data object (e.g., the opportunity data object of FIG. 4). The search engine 110 may then store the opportunity data object in an opportunity index of the search engine 110. The opportunity data object will then include the associated data (e.g., an account description) associated with the "Coca-Cola" account along with other fields (e.g., name, address, etc.) in the opportunity index.

At 310, the search engine 110 may receive a search phrase. For example, a user of a client device 120 may request a search of the phrase of an account "Coca-Cola."

At 312, the search engine 110 may generate a search result that includes the relational information retrieved from the index. For example, the search engine 110 may, in response to the search phrase "Coca-Cola" and based on the relational information in the opportunity index, generate a search result that includes all data objects (e.g., opportunities) associated with the search phrase (e.g., Coca-Cola) and based on the metadata (e.g., accounts, names, account descriptions, etc.). The search engine 110 may present the search result of opportunities related to "Coca-Cola" on a user interface (e.g., a display of the client device 120). Accordingly, searching efficiency may be improved by including metadata with a data object at least because the metadata may be used to link denormalized data of the search engine 110 with the normalized data of the database 140. The linking is accomplished using the binding expression (e.g., binding expression 404) which may ensure consistency of the data in the database 140 while also allowing replication of data in an index of the search engine 110. The consistency may be ensured because the binding expression may refer to a stable data field (e.g., a UUID) that does not change value and associates the stable field with another data field that may be variable (e.g., account name).

Figure 5:
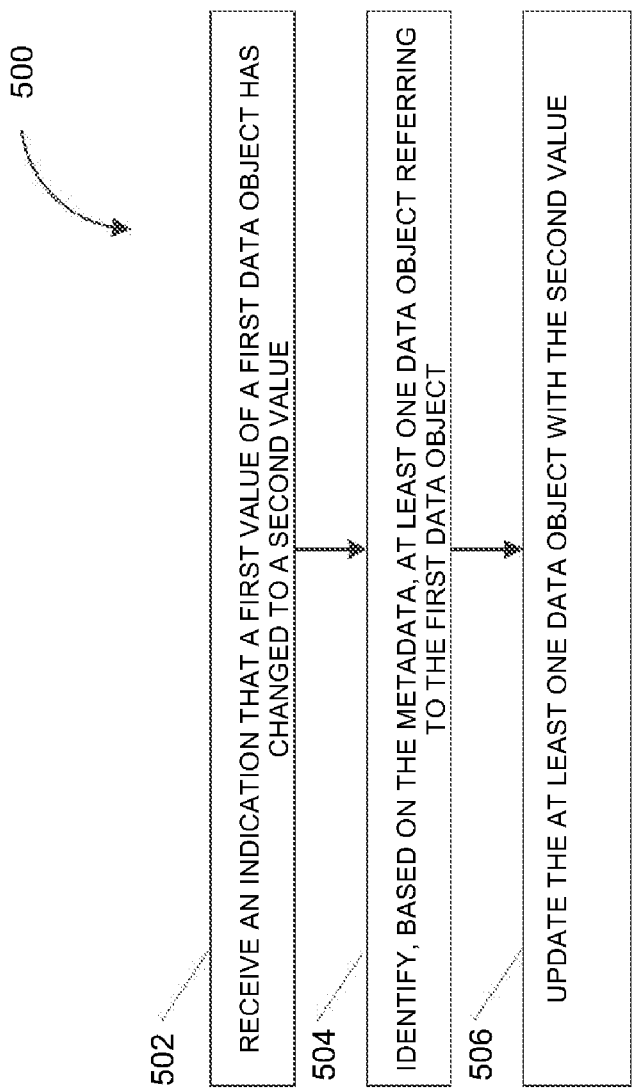
FIG. 5 depicts a flowchart illustrating a process for updating data of a search, in accordance with some example embodiments.

FIG. 5 depicts a flowchart illustrating a process 500 for updating data of a search engine, in accordance with some example embodiments. Referring to FIGS. 1-5, the process 500 may be performed by the search engine 110, the metadata server 115, the computing system 600, or the like.

At 502, the search engine 110 may receive, from the client 120, an indication that a first value of a first data object has changed. As shown in FIG. 1, the search engine 110 may be coupled with the client 120 (e.g., a browser, client application, and/or the like on a processor based device) via the network 130, which may be any type of wired and/or wireless network including, for example, a public land mobile network (PLMN), a local area network (LAN), a wide area network (WAN), a virtual local area network (VLAN), the Internet, and/or the like. The search engine 110 may receive, from the client 120 or database 140, an indication that a first value of a first data object has changed. For example, an account name may have changed from "Coca-Cola" to "Coca-Cola, Inc."

At 504, the search engine 110 may identify, based on the metadata, at least one data object referring to the first data object. In some example embodiments, the search engine 110, for example, the processor 210 may determine all foreign keys (e.g., UUID) associated with the first data object (e.g., account). The search engine 110 may then invert the foreign keys and identify data objects referencing outdated data. Thus, all data referencing "Coca-Cola" may identified since the foreign keys do not change when other fields are changed.

At 506, the search engine 110 may update the at least one data object with the changed first value. In some example embodiments, the search engine 110, after identifying data objects referencing the changed value, may update the data referencing the changed first data object based on the metadata. Thus, all data referencing "Coca-Cola" may automatically be updated with "Coca-Cola, Inc." which may ensure consistency in a bi-directional way.

Figure 6:
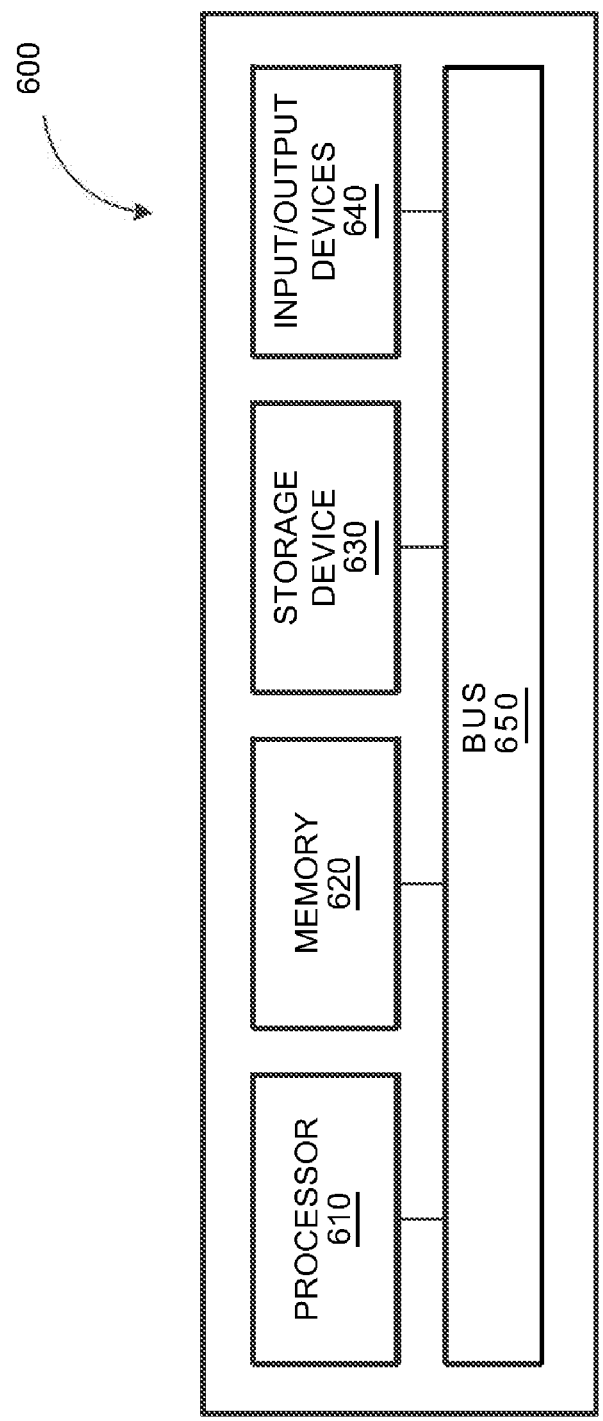
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1 and 6, the computing system 600 can be used to implement the search engine 110, the metadata server 115, and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the search engine 110. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, a tape device, a solid state drive, and/or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, at a search engine comprising a first index and a second index, an indication that a first data object was created at a database management system, the database management system being configured to be searched via at least the first index and the second index, each of the first index and the second index comprising a data silo of a respective data type, the first index being associated with the first data object;
   retrieving, by the search engine, metadata from a metadata server, the metadata being associated with the first data object, the metadata comprising structured, encoded data comprising a description of the first data object and a binding expression that comprises characters defining relational information between the first data object and a named data field of a second data object which is associated with the second index;

adding, based on the binding expression comprising the relational information, data from the named data field of the second data object to the first data object;

storing, in response to the adding, the metadata and the first data object comprising the data added from the named data field of the second data object in the first index of the search engine;

receiving, by the search engine, a search phrase; and generating, by the search engine and based on the first index, a search result obtained based on the search phrase and added metadata comprising the named data field of the second data object.

2. The system of claim 1, the operations further comprising:

obtaining, by the search engine, an indication that a first value of a first data object has changed to a second value;

identifying, based on the metadata, at least one data object referring to the first data object; and updating, in response to the identifying, the at least one data object with the second value.

3. The system of claim 2, wherein the identifying comprises inverting the at least one data object.

4. The system of claim 1, wherein adding metadata to the first data object is performed by a metadata server.

5. The system of claim 1, wherein generating the search result comprises presenting the search result on a user interface.

6. The system of claim 1, wherein the database management system comprises a relational database, and wherein the search engine queries the relational database by at least sending, to the relational database, one or more structured query language (SQL) statements.

7. The system of claim 1, wherein the search phrase is processed by at least eliminating variations of one or more words in the search phrase.

8. The system of claim 1, wherein storing the metadata comprises storing the metadata in a secondary persistence of the database management system.

9. The system of claim 1, wherein the metadata comprises a tree data structure having nodes, the nodes comprising data fields.

10. A computer-implemented method, comprising:

receiving, at a search engine comprising a first index and a second index, an indication that a first data object was created at a database management system, the database management system being configured to be searched via at least the first index and the second index, each of the first index and the second index comprising a data silo of a respective data type, the first index being associated with the first data object;

retrieving, by the search engine, metadata from a metadata server, the metadata being associated with the first data object, the metadata comprising structured, encoded data comprising a description of the first data object and a binding expression that comprises characters defining relational information between the first data object and a named data field of a second data object which is associated with the second index;

adding, based on the binding expression comprising the relational information, data from the named data field of the second data object to the first data object;

storing, in response to the adding, the metadata and the first data object comprising the data added from the named data field of the second data object in the first index of the search engine;

receiving, by the search engine, a search phrase; and generating, by the search engine and based on the first index, a search result obtained based on the search phrase and added metadata comprising the named data field of the second data object.

11. The method of claim 10, further comprising:

obtaining, by the search engine, an indication that a first value of a first data object has changed to a second value;

identifying, based on the metadata, at least one data object referring to the first data object; and updating, in response to the identifying, the at least one data object with the second value.

12. The method of claim 11, wherein the identifying comprises inverting the at least one data object.

13. The method of claim 10, wherein adding the metadata to the first data object is performed by a metadata server.

14. The method of claim 10, wherein generating the search result comprises presenting the search result on a user interface.

15. The method of claim 10, wherein the database management system comprises a relational database, and wherein the search engine queries the relational database by at least sending, to the relational database, one or more structured query language (SQL) statements.

16. The method of claim 10, wherein storing the metadata comprises storing the metadata in a secondary persistence of the database management system.

17. A non-transitory computer readable medium storing instructions, which when executed by at least one data processor, result in operations comprising:

receiving, at a search engine comprising a first index and a second index, an indication that a first data object was created at a database management system, the database management system being configured to be searched via at least the first index and the second index, each of the first index and the second index comprising a data silo of a respective data type, the first index being associated with the first data object;

retrieving, by the search engine, metadata from a metadata server, the metadata being associated with the first data object, the metadata comprising structured, encoded data comprising a description of the first data object and a binding expression that comprises characters defining relational information between the first data object and a named data field of a second data object which is associated with the second index;

adding, based on the binding expression comprising the relational information, data from the named data field of the second data object to the first data object;

storing, in response to the adding, the metadata and the first data object comprising the data added from the named data field of the second data object in the first index of the search engine;

receiving, by the search engine, a search phrase; and generating, by the search engine and based on the first index, a search result obtained based on the search phrase and added metadata comprising the named data field of the second data object.

18. The non-transitory computer readable medium of claim 17, the operations further comprising:

obtaining, by the search engine, an indication that a first value of a first data object has changed to a second value;

identifying, based on the metadata, at least one data object referring to the first data object; and updating, in response to the identifying, the at least one data object with the second value.

\* \* \* \* \*